(12) United States Patent
Plantan et al.

(10) Patent No.: US 6,267,043 B1
(45) Date of Patent: Jul. 31, 2001

(54) BRAKE ACTUATOR ASSEMBLY

(75) Inventors: Ronald S. Plantan, Charlotte; Gregory A. Greenly, Harrisburg, both of NC (US)

(73) Assignee: Indian Head Industries, Inc., Charlotte, NC (US)

( * ) Notice: Subject to any disclaimer, the term of this patent is extended or adjusted under 35 U.S.C. 154(b) by 0 days.

(21) Appl. No.: 09/430,085

(22) Filed: Oct. 29, 1999

(51) Int. Cl.$^7$ ....................................................... F01B 7/00
(52) U.S. Cl. .................................. 92/63; 92/167; 92/168
(58) Field of Search .............................. 92/165 R, 166, 92/167, 168, 165 PR, 63

(56) References Cited

U.S. PATENT DOCUMENTS

| | | | |
|---|---|---|---|
| 607,596 | * 7/1898 | Baker | 403/157 |
| 1,470,120 | * 10/1923 | Schaefer | 228/170 |
| 1,657,875 | * 1/1928 | Wright | 403/157 |
| 1,784,966 | * 12/1930 | Johnson | 403/157 |
| 3,101,219 | 8/1963 | Herrera . | |
| 3,584,711 | * 6/1971 | Margetts | 188/196 |
| 3,730,056 | 5/1973 | Swander, Jr. . | |
| 4,116,114 | * 9/1978 | Swander et al. | 92/130 A |
| 4,196,642 | * 4/1980 | Cale | 74/519 |
| 4,414,726 | * 11/1983 | Cale, Jr. | 29/156.5 A |
| 4,444,350 | * 4/1984 | Crummett | 228/112 |
| 4,531,665 | * 7/1985 | Cale, Jr. | 228/170 |
| 4,563,105 | * 1/1986 | Stahl | 403/157 |
| 4,643,279 | * 2/1987 | Skurka | 188/79.5 |
| 4,960,036 | 10/1990 | Gummer et al. . | |
| 5,372,059 | 12/1994 | Pierce et al. . | |
| 5,392,691 | * 2/1995 | Schultz | 92/168 |
| 5,722,311 | 3/1998 | Pierce et al. . | |
| 6,006,651 | * 12/1999 | Pierce et al. | 92/63 |
| 6,029,447 | * 2/2000 | Sojic et al. | 60/453 |

* cited by examiner

Primary Examiner—Robert J. Oberleitner
Assistant Examiner—Benjamin A. Pezzlo
(74) Attorney, Agent, or Firm—Howard & Howard

(57) ABSTRACT

The brake actuator assembly of this invention significantly reduces accumulation of road debris, reduces the weight of the push rod and yoke assembly and friction between the mating parts. The brake actuator includes a housing defining a chamber having an opening through the end wall, a push rod and yoke assembly reciprocally mounted within the housing chamber and a shield located within the housing closely receiving the exterior surface of the push rod and yoke assembly which has a smooth substantially continuous external surface. In the preferred embodiment, the yoke is secured to the push rod within the housing chamber, surrounding the push rod having an elliptical exterior surface which sheds accumulation of road debris.

20 Claims, 3 Drawing Sheets

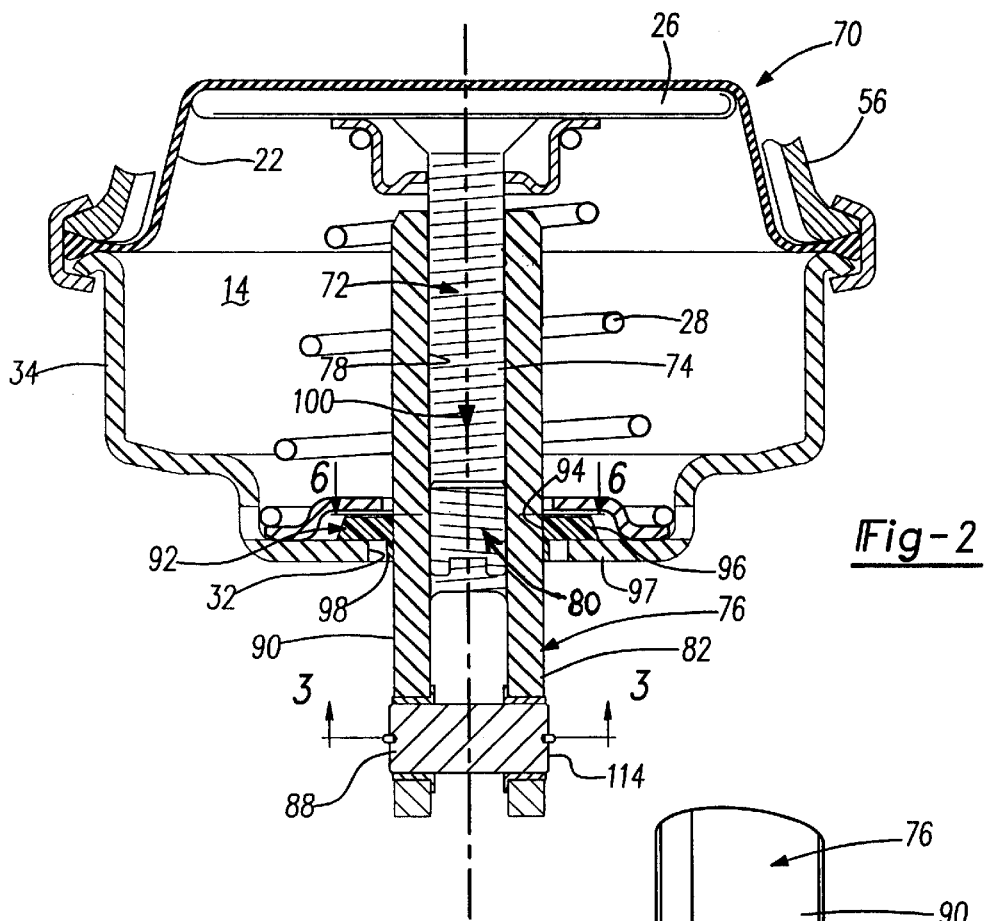
*Fig-2*
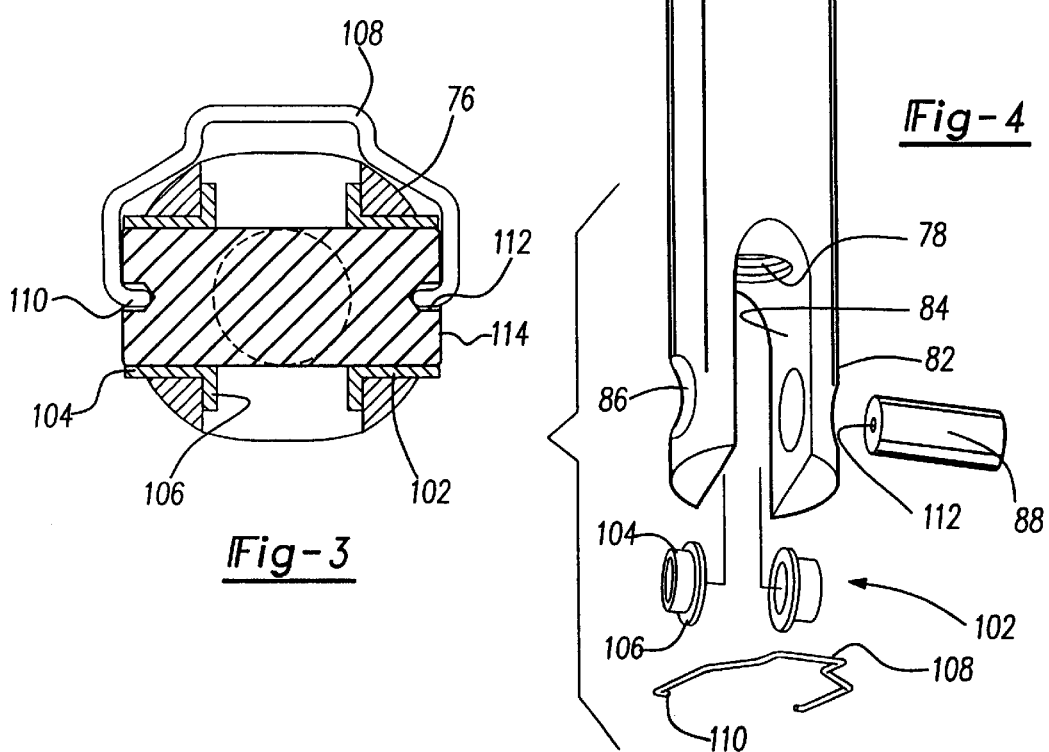
*Fig-3*
*Fig-4*

BRAKE ACTUATOR ASSEMBLY

BACKGROUND OF THE INVENTION

1. Technical Field

The subject invention relates generally to braking systems and, more specifically, to fluid-operated brake actuators such as air or pneumatic brake actuators.

2. Description of the Prior Art

Fluid-operated braking systems, such as air brake systems, have long been used to control movement of motor vehicles in a safe and effective manner. In particular, air brakes are commonly used on commercial vehicles such as trucks, trailers and buses, which typically have large gross vehicle weights. The considerable inertial mass of these heavy-duty vehicles in combination with the high speeds at which they travel requires a braking system which responds rapidly with substantial braking power. One system component which is instrumental in the operation of air brake systems is the brake actuator. The brake actuator provides the force necessary when braking the vehicle. The assignee of the preset invention produces a number of high-quality commercial air brake actuators.

One such prior art brake actuator is a spring brake actuator shown at 10 in FIG. 1. The prior art spring brake actuators 10 typically have a network of air chambers 12, 14 defined by flexible diaphragms 20, 22 and the respective housing components. Typically, the top air chamber 12 is an emergency chamber and the bottom or service chamber 14 is a working chamber. The service chamber 14 includes a push rod 24 having a head or piston 26 which is biased against the diaphragm 22 by return spring 28. When the brake is actuated by the operator, the inlet port 30 is pressurized by the pneumatic pressure of the vehicle, reversing the cup-shaped flexible diaphragm 22 which reacts against the piston 26, driving the push rod 24 through an opening 32 in the end wall of the service chamber housing 34 as shown by arrow 36, actuating the braking system of the vehicle. The emergency chamber 12 includes a piston or push rod 38 having a head 40 which is biased against the diaphragm 20 by return spring 42. In a spring brake actuator of the type shown, the emergency chamber further includes a power spring 44 which is spring biased against the head or cover 46 and the spring side piston 48. The pneumatic pressure system of the vehicle acting through port 50 counterbalances the force of the power spring 44, such that the power spring is normally collapsed as shown in FIG. 1. However, when the pneumatic pressure system of the vehicle fails or the parking brake is actuated, the pressure in the emergency chamber 12 returns to atmospheric pressure and the power spring 46 expands against the piston 48, collapsing the cup-shaped diaphragm 20 and driving the piston 38 through an opening 52 in the web 54 of the flange case 56, driving the push rod 24 through the opening 32 in the housing 34, actuating the braking of the vehicle. Thus, the emergency chamber 12 serves as an emergency brake in the event that the pneumatic system of the vehicle fails or a parking brake.

The push rod 24 is connected to the braking system of the vehicle by a bifurcated yoke 58 and locking pin 60 as described below. The push rod 24 is externally threaded into an internal threaded opening in the yoke 58 (not shown) and retained in place by lock nut 62. The overall length of the push rod 24 and yoke 58 assembly is important to proper actuation of the braking system. The opening 32 in the end wall of the service chamber 34 must be wide enough to accommodate lateral or skewed motion of the push rod, as shown. This opening 32 in the disclosed embodiment is protected by a stone shield 64 and the cup-shaped retainer plate 66. The stone shield 64 is permitted to move laterally in the retainer plate 66, as shown. The stone shield 64 is conventionally formed of a relatively hard polypropylene to resist stones and debris during normal operation of the vehicle as described below.

As would be understood by those skilled in this art, brake actuators are normally attached to mounting plates on the underside of the vehicle chassis. Thus, the brake actuators are subject to extreme conditions including road debris, ice, snow and extreme temperature variations. Typically, dirt and ice collects on the yoke 58, locking pin 60, lock nut 62 and the threads on the push rod 24. Further, dirt and ice can penetrate the opening 32 in the end wall of the service chamber housing 34 accumulating on these various components. This accumulation of ice and debris may interfere with the movement of the push rod or prevent lateral movement of the push rod as described. Further, the externally threaded push rod wears the internal opening through the stone shield 64, reducing the life of these components. Another disadvantage of the yoke assembly shown is the number of components which must be accurately assembled to control the overall length of the assembly. Tests of this assembly have shown that the stroke length may be reduced as much as 15 mm., which can adversely affect braking performance. Another deficiency is the metal to metal contact between the yoke 58 and the locking pin 60 which directly interconnects the yoke with the metal control arm (not shown). After repeated use, the metal to metal contact may become increasingly worn and subject to fatigue.

There is therefore a need for an improved push rod and yoke assembly which is of simple and cost-effective design, easy to install and which avoids accumulation of road debris and ice. Another object would be to reduce the overall weight of the push rod and yoke assembly. Finally, the push rod and yoke assembly should have an attachment device which is less stressful on the corresponding parts.

SUMMARY OF THE INVENTION

The brake actuator assembly of this invention includes a housing defining a chamber including an end wall having an opening therethrough. As will be understood by those skilled in this art, there are several types of brake actuators including dual diaphragm spring brake actuators as disclosed, for example in FIG. 1, piston-type brake actuators, etc. The improved brake actuator assembly of this invention is not limited to any particular type of brake actuator provided the brake actuator includes a housing and a push rod and yoke assembly. Further, the brake actuator of this invention may include only a service chamber for example.

The brake actuator assembly of this invention includes a push rod and yoke assembly which is reciprocally mounted within the housing chamber having a distal end portion selectively extending through the housing end wall opening preferably having a bifurcated end portion. A shield is located within the housing chamber on the end wall having an opening therethrough coaxially aligned with the opening through the end wall of the housing which closely receives the push rod and yoke assembly. The distal end portion of the push rod and yoke assembly of this invention includes a smooth continuous external surface which reduces accumulation of foreign material such as road debris and ice. Further, the shield continuously wipes accumulated foreign material from the smooth continuous external surface of the push rod and yoke assembly as it reciprocates through the housing end wall opening.

In the preferred embodiment of the brake actuator assembly of this invention, the push rod and yoke assembly includes a push rod which is reciprocally mounted within the housing chamber having a free end coaxially aligned with the housing end wall opening and a yoke having a first end secured to the push rod within the housing chamber and the yoke extends through the shield opening through the housing end wall opening having a smooth continuous external surface. In the most preferred embodiment of the invention, the distal end portion of the push rod is externally threaded and the first end of the yoke includes an internally threaded bore threadably received on the push rod essentially surrounding the push rod within the housing. The free end of the yoke is preferably bifurcated having an opening therethrough to receive the control arm of the braking system. In the most preferred embodiment of the yoke, the yoke is formed of aluminum to reduce the weight of the assembly and the smooth continuous external surface is elliptical to further reduce the weight of the push rod and yoke assembly while maintaining the required strength. In this embodiment, the opening through the shield is also elliptical preferably including a planar portion overlying the housing end wall and a tubular portion which extends into the end wall opening. The shield is preferably formed of a lubricating polymeric material, such as Nylon®.

The bifurcated free end of the yoke includes a transverse preferably cylindrical bore or opening to receive a locking pin. Where the yoke is elliptical in cross-section, the bifurcated opening preferably extends through the smaller dimension and the bore which receives the locking pin extends through the larger dimension. In the most preferred embodiment, the cylindrical bore through the bifurcated free end of the yoke includes bushings, such as friction resistant bimetallic bushings, which reduces the wear between the metal parts. The yoke is threadably secured to the push rod by a set screw or pin.

The brake actuator assembly of this invention thus solves the problems associated with the push rod and yoke assemblies of the prior art, as shown for example in FIG. 1. First, the push rod and yoke assembly is essentially self-cleaning. That is, the smooth continuous external surface of the yoke which extends through the housing end wall opening will accumulate substantially less road debris and ice. Further, the external surface of the yoke is continuously wiped of accumulated foreign material as the yoke reciprocates through the shield. Further, the brake actuator assembly of this invention reduces the number of parts required for installation. Further, the push rod and yoke assembly of the brake actuator assembly of this invention reduces wear of the shield and wear between the mating metal parts, particularly as installed in a braking system. Finally, the testing of this assembly indicates that the reduction in the overall length of the push rod and yoke assembly has been substantially eliminated. Other advantages and meritorious features of the improved brake actuator assembly of this invention will be more fully understood from the following description of the preferred embodiments, the claims and the appended drawings, a brief description of which follows.

BRIEF DESCRIPTION OF THE DRAWINGS

FIG. 2 is a partial side cross-sectional view of one embodiment of the improved brake actuator assembly of this invention;

FIG. 4 is an exploded view of the yoke and locking pin assembly shown in FIG. 2;

FIG. 3 is an end cross-sectional view of FIG. 2 in the direction of view arrows 3—3;

DESCRIPTION OF THE PREFERRED EMBODIMENTS

Figure 1:
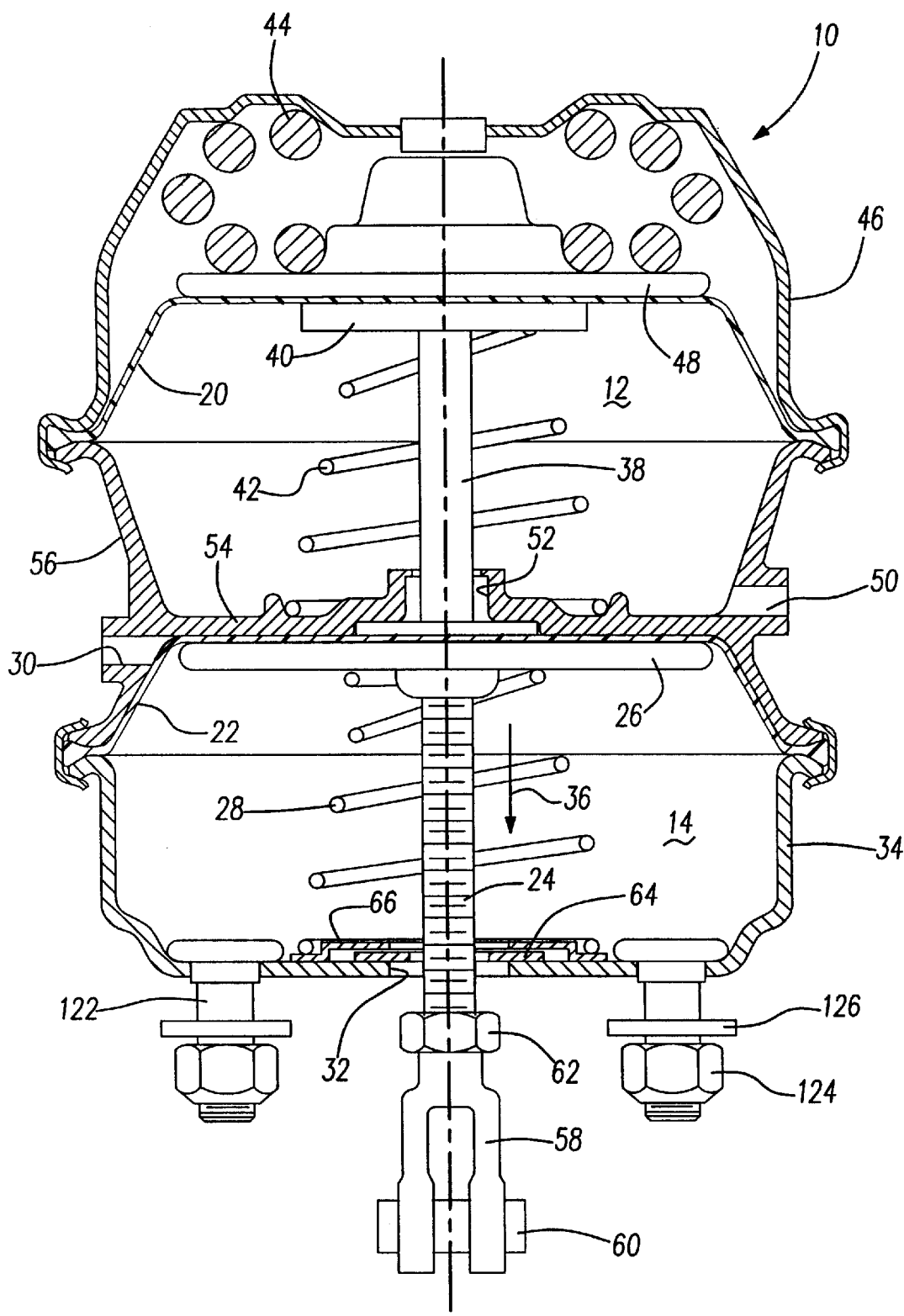
FIG. 1 is a side cross-sectional view of a prior art dual diaphragm spring brake actuator described above.

Referring to the figures, wherein like numerals indicate like or corresponding parts throughout the several views, a prior art dual diaphragm spring brake actuator 10 is shown in FIG. 1 and described above in the Description of the Prior Art. As set forth above, the brake actuator assembly of this invention is particularly concerned with improvements in the push rod and yoke assembly shown in FIG. 1 which is conventional with brake actuators of this general type. Briefly, the push rod 24 in the service chamber 14 is externally threaded and threaded into an internally threaded bore in the yoke 58 which is located outside the housing chamber. The overall length of the push rod and yoke assembly is controlled by lock nut 62. A flat stone shield 64 having an opening therethrough is received over the end wall of the service chamber housing 34 and generally retained in place by a cup-shaped stamping 66. The enlarged bifurcated end of the yoke 58, the locking pin 60, the lock nut 62 and the externally threaded push rod 24 accumulate road debris and ice and the externally threaded push rod 24 wears against the stone shield 64 during reciprocal motion of the push rod through the stone shield. As described above, a brake actuator is mounted to the underside of the vehicle chassis, subjecting the exposed components to extreme weather conditions, road debris and ice. This accumulation of road debris and ice adversely affects the operation of the brake actuator for the reasons set forth above. Further, the yoke and locking pin assembly is subject to metal to metal wear during normal operation of the brake actuator and the interconnected components of the braking system of the vehicle. There is therefore, a longstanding need for an improved brake actuator which eliminates these problems.

FIG. 2 illustrates one embodiment of a brake actuator having the improved push rod and yoke assembly and shield of this invention. As described above in regard to FIG. 1, the brake actuator assembly of this invention may be a conventional dual diaphragm spring brake actuator, a service brake actuator or a piston-type brake actuator. The disclosed embodiment of the brake actuator 70 is a dual diaphragm spring brake actuator having a service chamber 14 and an emergency chamber 12 as shown for example in FIG. 1. The service chamber 14 includes a housing 34, a return spring 28 and a service chamber diaphragm 22. As described above, however, the improved push rod and yoke assembly and shield of the brake actuator 70 of this invention may be utilized with any type of brake actuator.

The brake actuator assembly 70 shown in FIG. 2 includes a push rod 72 having an externally threaded portion 74 and a yoke 76 having an internally threaded bore which threadably receives the threaded portion 74 of the push rod and generally surrounds the push rod within the service chamber 14. The overall length of the push rod and yoke assembly is controlled by set screw 80. The free end 82 of the yoke is preferably bifurcated as best shown in FIG. 4 including a longitudinal opening 84 which receives the control arm of the braking system as described below in regard to FIG. 5. The bifurcated free end 82 of the yoke 76 further includes a transverse cylindrical bore 86 which receives locking pin 88. As described above, the external surface 90 of the yoke 76 is smooth and substantially continuous to reduce the accumulation of road debris and ice. Further, as shown in FIG. 2, the yoke 76 surrounds the externally threaded push rod 72 within the service chamber 14 preventing the accumulation of ice and road debris on the externally threaded portion 74.

Figure 6:
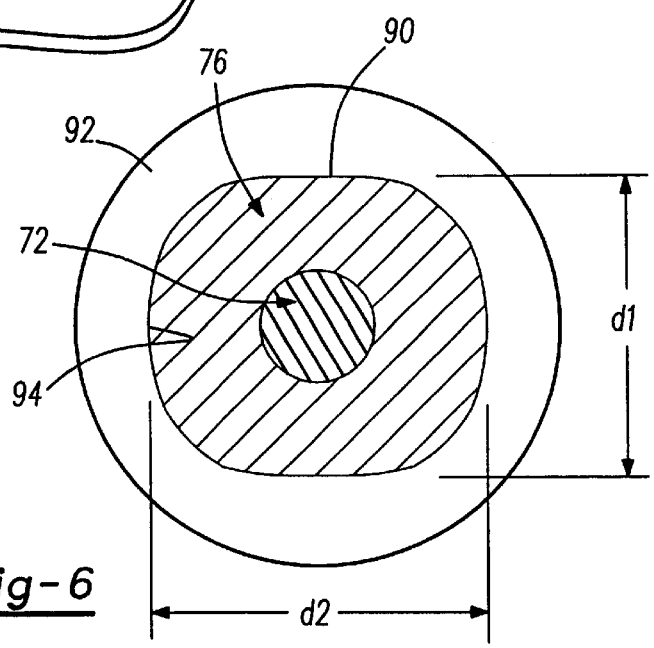
FIG. 6 is an end cross-sectional view of FIG. 2 in the direction of view arrows 6—6.

In the most preferred embodiment of the push rod and yoke assembly, the yoke is elliptical in cross section as best shown in FIG. 6, wherein the dimension d2 is greater than the transverse dimension d1. Further, as shown in FIGS. 3 and 4, the longitudinal opening 84 is through the smaller dimension d1 and the transverse 86 which receives the cylindrical locking pin 88 is through the larger dimension d2. Further, the yoke 78 is preferably formed of a lightweight metal, such as extruded aluminum.

The improved shield 92 includes an opening 94 which receives the yoke 76 as shown in FIG. 2 and includes a planar portion 96 overlying the end wall 97 of the housing 34 and a tubular portion 98 which is received within the opening 32 through the end wall of the housing. As shown in FIG. 2, the internal surface 94 of the shield 92 closely receives the smooth external surface 90 of the yoke, thereby continuously wiping the external surface 90 of the yoke as the yoke reciprocates through the opening 32 of the housing. In the most preferred embodiment where the external surface 90 of the yoke is elliptical, the internal surface 94 of the shield is also elliptical to wipe the external surface 90 of the push rod. Further, the shield 92 is preferably formed of a self-lubricating polymeric material, such as Nylon®. As will now be understood, the shield 92 continuously wipes the smooth exterior surface 90 of the yoke 76 as the push rod and yoke assembly reciprocates through the opening 32 in the end wall 97 of the housing thereby removing any accumulation of road debris and ice. Further, the smooth exterior surface 90 of the yoke substantially reduces wear of the shield, particularly when compared with a conventional push rod and yoke assembly where the push rod 24 is externally threaded as shown in FIG. 1. The improved shield 92 also reduces entry of road debris into the interior of the service chamber 14, but permits lateral movement of the push rod and yoke assembly because the external diameter of the tubular portion 98 is less than the internal diameter of the opening 32 as shown in FIG. 2. Finally, the use of an aluminum yoke 76 with a shortened push rod 74 substantially reduces the weight of the assembly. Finally, as described below, the brake actuator assembly of this invention also reduces wear between the metal contacting parts, thus achieving the objects of this invention.

Figure 5:
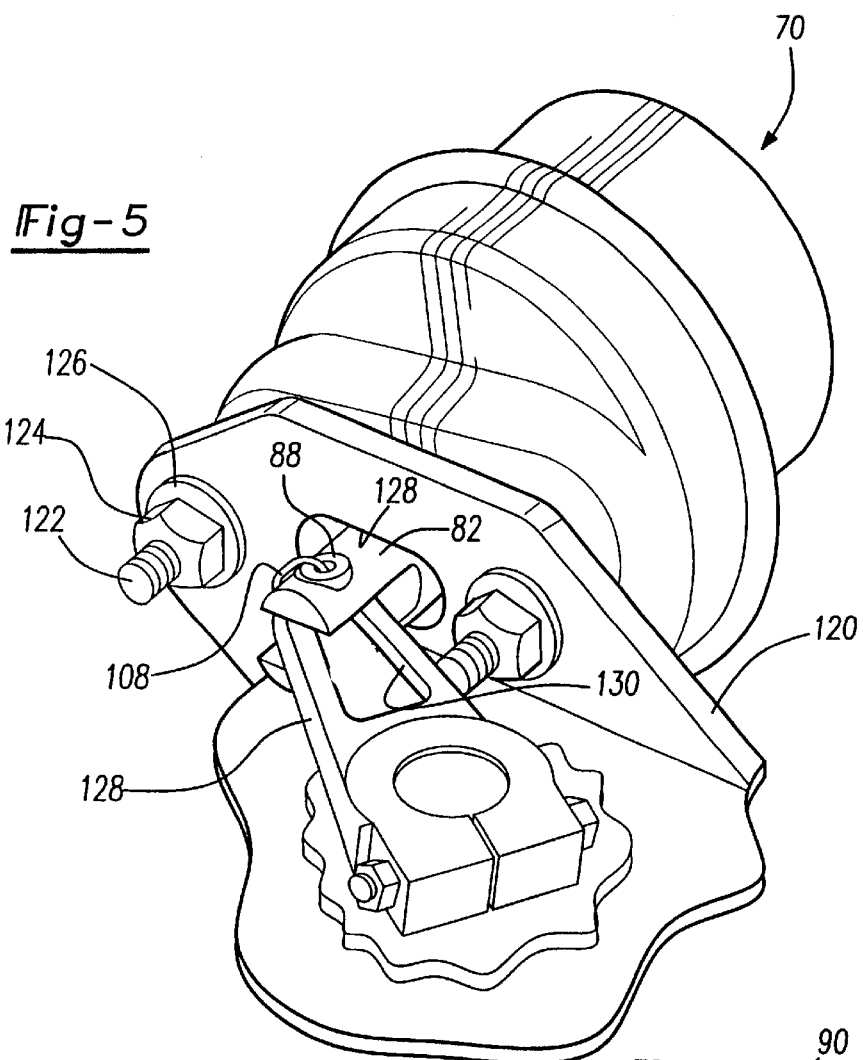
FIG. 5 is an end perspective view of the spring brake actuator illustrated in FIG. 2 mounted on a vehicle and connected to the braking system of the vehicle.

As best shown in FIGS. 3 and 4, in the preferred embodiment of this invention, bushings 102, preferably bimetallic bushings, are inserted into the bore 86 and receive the locking pin 88. A suitable bushing material is a laminated friction resistant alloy sold under the trade name "GARLOCK DU." The bushings 102 in this embodiment include a tubular portion 104 and a flange portion 106 which is received against the internal surface of the longitudinal opening or slot 84 which retains the bushings in place. As best shown in FIG. 5, the assembly is retained by a U-shaped resilient metal retaining clip 108 having inwardly opposed distal end portions 110 received in bores 112 in the ends of the locking pin 88. The locking pin assembly is thus quick and easy to install and may be easily removed. Further, because the ends 114 of the locking pin 88 are substantially flush with the exterior surface 90 of the yoke 76 as shown in FIGS. 2 and 3, there is substantially less accumulation of road debris and ice particularly when compared with the yoke 58 and locking pin assembly shown in FIG. 1.

FIG. 5 illustrates a typical application of the improved brake actuator assembly 70 of this invention. As described above, the brake actuator 70 is normally secured to a mounting plate on the underside of the vehicle chassis, such as the mounting plate 120 shown in FIG. 5. The mounting plate includes holes (not shown) which receive the mounting bolts 122 secured to the end wall of the housing as also shown in FIG. 1. FIG. 2 is a cross section through the reduced diameter end wall of the housing, perpendicular to the cross section of FIG. 1. The mounting bolts are secured to the mounting plate by nuts 124 and washers 126 as is a conventional brake actuator. The free bifurcated end 82 of the yoke is received through an oblong opening 128 in the mounting plate 120 as shown in FIG. 5. The bifurcated end is then connected to the control arm 128 of the braking system by locking pin 88 received through the opening 130 in the control arm. As will be understood, the friction resistant bushings 102 shown in FIGS. 3 and 4 significantly reduce the metal to metal wear between the yoke and the control arm 128 further improving the brake actuator assembly of this invention. Further, the elliptical cross section of the yoke permits the yoke to be received through a smaller diameter opening 128 in the mounting plate 120, strengthening the mounting plate. Further, as described above, in the most preferred embodiment of the yoke 76, the opening 84 is through the smaller dimension d1 of the elliptical cross section of the yoke and the bore 86 is through the larger dimension providing optimum strength for the yoke.

The improved brake actuator of this invention therefore achieves the objects of this invention and solves the problems associated with the push rod and yoke assemblies of the prior art. The push rod and yoke assembly of this invention is essentially self-cleaning, thereby significantly reducing accumulation of road debris and ice. The shield 92 continuously wipes the smooth continuous exterior surface 90 of the yoke removing any accumulated foreign material. Further, the push rod and yoke assembly reduces the number of parts required for installation, assures that the combined length of the push rod and yoke assembly remains constant and reduces frictional wear between the assembled parts. As will be understood, however, various modifications may be made to the disclosed embodiment of the improved brake actuator assembly of this invention within the preview of the appended claims. For example, the yoke 90 may be cylindrical or include other configurations provided the surface is smooth and substantially continuous. Other means may also be used to secure the locking pin 88 to the free end 82 of the yoke. However, the retaining clip 108 provides easy assembly and removal. Finally, the improvements to the brake actuator of this invention are not limited to the type of the brake actuator, as described above.

What is claimed:

1. A brake actuator assembly, comprising:

a housing defining a chamber therein including an end wall having an opening therethrough;

a push rod and yoke assembly reciprocally mounted within said housing chamber having a distal end portion selectively reciprocating through said housing end wall opening having a bifurcated end portion; and a shield located within said housing on said end wall having an opening therethrough coaxially aligned with said housing end wall opening and closely receiving said push rod and yoke assembly distal end portion;

wherein said yoke including said bifurcated end portion has a smooth continuous external surface of substantially constant longitudinal cross section throughout its length reducing accumulation of foreign material and said shield continuously wipes accumulated foreign material from said external surface.

2. The brake actuator assembly defined in claim 1, wherein said push rod and yoke assembly comprises a push rod reciprocally mounted within said housing chamber and a yoke secured to said push rod within said housing chamber including said distal end portion having said smooth continuous external surface.

3. The brake actuator assembly defined in claim 1, wherein said smooth continuous external surface is elliptical in cross section having a first dimension greater than a second perpendicular dimension and wherein said bifurcated opening is through said second dimension.

4. The brake actuator assembly defined in claim 3, wherein said opening through said shield is elliptical closely receiving said smooth continuous external surface of said yoke.

5. The brake actuator assembly defined in claim 1, wherein said bifurcated end portion of said push rod and yoke assembly includes a transverse bore therethrough and a locking pin received within said transverse bore having a length generally equal to the width of said distal end portion at said transverse opening.

6. The brake actuator defined in claim 5, wherein said transverse bore through said bifurcated end portion includes a tubular bushing surrounding said locking pin.

7. The brake actuator defined in claim 1, wherein said push rod and yoke assembly includes a push rod reciprocally mounted within said housing chamber having an externally threaded end portion and a yoke having an internally threaded bore threadably mounted on said threaded end portion of said push rod and surrounding said push rod within said housing chamber, said yoke including said distal end portion having said smooth continuous external surface and said bifurcated end portion.

8. The brake actuator defined in claim 7, wherein said yoke is formed of aluminum, wherein said smooth continuous external surface is elliptical and said opening through said shield is elliptical closely receiving said yoke.

9. The brake actuator defined in claim 1, wherein said shield includes a planar portion overlying said housing end wall having a dimension greater than said opening and a tubular portion extending into said end wall opening and said opening through said shield extends through said planar portion and said tubular portion.

10. The brake actuator defined in claim 9, wherein said tubular portion has a width less than said opening through said end wall of said housing permitting lateral movement of said distal end of said push rod and yoke assembly.

11. A brake actuator assembly, comprising:
a housing defining a chamber including an end wall having an opening therethrough;
a push rod reciprocally mounted within said housing chamber coaxially aligned with said housing end wall opening;
a yoke having a first end portion secured to said push rod within said housing chamber and a second end portion extending through said housing chamber end wall opening having a smooth continuous external surface reducing accumulation of foreign material; and
a shield located within said housing chamber on said end wall having an opening therethrough coaxially aligned with said opening through said end wall closely receiving said yoke and continuously wiping accumulated foreign material from said smooth continuous external surface of said yoke.

12. The brake actuator assembly defined in claim 11, wherein said smooth continuous external surface of said yoke is elliptical in cross section and said opening through said shield is elliptical closely receiving said elliptical external surface of said yoke.

13. The brake actuator assembly defined in claim 12, wherein said second end portion of said yoke has a free end having an opening therethrough defining a bifurcated end portion and a second transverse bore through said bifurcated end portion receiving a locking pin having a length generally equal to the width of said bifurcated end portion.

14. The brake actuator assembly defined in claim 11, wherein said shield includes a planar portion overlying said end wall and a tubular portion extending into said housing chamber end wall opening, said opening through said shield extending through said planar portion and said tubular portion.

15. The brake actuator assembly defined in claim 11, wherein said push rod distal end portion is externally threaded and said yoke includes an internally threaded bore threadably receiving said externally threaded distal end portion of said push rod and surrounding said push rod within said housing chamber.

16. The brake actuator assembly defined in claim 15, wherein said yoke is formed of aluminum having an elliptical cross-section.

17. The brake actuator assembly defined in claim 16, wherein said second end portion of said yoke includes a bifurcated end portion having an opening therethrough and said bifurcated free end portion of said yoke includes a transverse cylindrical bore receiving a cylindrical locking pin.

18. The brake actuator assembly defined in claim 17, wherein said cylindrical bore through said bifurcated end portion of said yoke includes a tubular bushing surrounding said locking pin.

19. A brake actuator assembly, comprising:
a housing defining a chamber including an end wall having an opening therethrough;
a push rod reciprocally mounted within said housing chamber having an externally threaded distal end portion coaxially aligned with said housing opening;
a yoke having a first end portion including an internally threaded bore threadably received on said externally threaded distal end portion of said push rod surrounding said push rod within said housing chamber and a second end portion extending through said housing chamber end wall opening having a bifurcated free end, said yoke including said bifurcated free end having a smooth continuous external surface reducing accumulation of foreign material; and
a shield located within said housing on said end wall having an opening therethrough coaxially aligned with said opening through said end wall and closely receiving said yoke continuously wiping accumulated foreign material from said smooth continuous external surface of said yoke.

20. The brake actuator assembly defined in claim 19, wherein said smooth continuous external surface of said yoke is elliptical in cross section having a first dimension greater than a second perpendicular dimension and said bifurcated free end having an opening through said smaller second dimension.

* * * * *